United States Patent
Panchaksharaiah et al.

(10) Patent No.: US 12,177,526 B2
(45) Date of Patent: Dec. 24, 2024

(54) METHODS AND SYSTEMS FOR OPERATING A GROUP WATCHING SESSION

(71) Applicant: Adeia Guides Inc., San Jose, CA (US)

(72) Inventors: Vishwas Sharadanagar Panchaksharaiah, Tiptur (IN); Madhusudhan Seetharam, Bangalore (IN); Harshith Kumar Gejjegondanahally Sreekanth, Karnataka (IN); Harsha Neerakani, Karnataka (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/751,889

(22) Filed: May 24, 2022

(65) Prior Publication Data
US 2023/0388601 A1    Nov. 30, 2023

(51) Int. Cl.
*H04N 21/4788* (2011.01)
*H04N 21/442* (2011.01)
*H04N 21/45* (2011.01)

(52) U.S. Cl.
CPC ... *H04N 21/4788* (2013.01); *H04N 21/44213* (2013.01); *H04N 21/4532* (2013.01)

(58) Field of Classification Search
CPC ......... H04N 21/4788; H04N 21/44213; H04N 21/4532; H04L 41/026; H04L 12/18; H04L 12/1813
See application file for complete search history.

(56) References Cited

U.S. PATENT DOCUMENTS

| | | | |
|---|---|---|---|
| 10,182,024 B1 * | 1/2019 | Chung | H04L 51/10 |
| 10,248,919 B2 * | 4/2019 | Shuster | G06Q 10/06311 |
| 2010/0205541 A1 * | 8/2010 | Rapaport | G06Q 10/10 715/753 |
| 2011/0154224 A1 * | 6/2011 | Bates | H04N 21/4788 715/758 |
| 2014/0344854 A1 * | 11/2014 | Kanojia | H04N 21/233 725/34 |
| 2015/0128175 A1 * | 5/2015 | Eklund | H04N 21/4508 725/116 |
| 2017/0339081 A1 * | 11/2017 | Beust | H04L 51/046 |

* cited by examiner

*Primary Examiner* — Michael E Teitelbaum
*Assistant Examiner* — Akshay Doshi
(74) *Attorney, Agent, or Firm* — Haley Guiliano LLP

(57) ABSTRACT

Systems and methods are described for operating a group watching session. In particular, group communications for a group watching session displaying a media content item to multiple users is initiated, one or more communication clusters for the group communication is generated, a user preference of a first user of the multiple users participating in the group communication is determined, and, based on the user preference, the first user is assigned to a first communication cluster of the one or more communication clusters for communication with another of the multiple users.

20 Claims, 6 Drawing Sheets

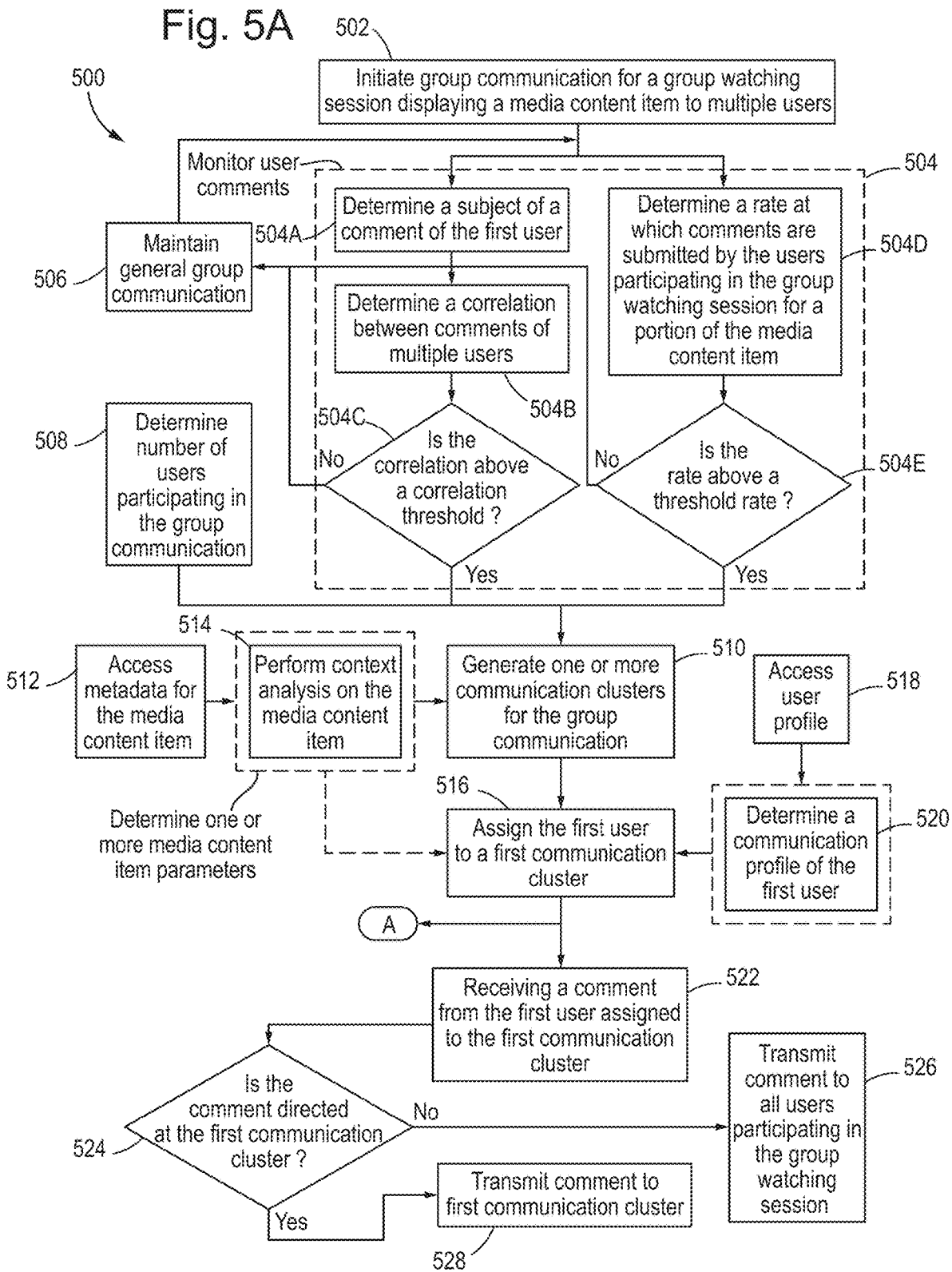

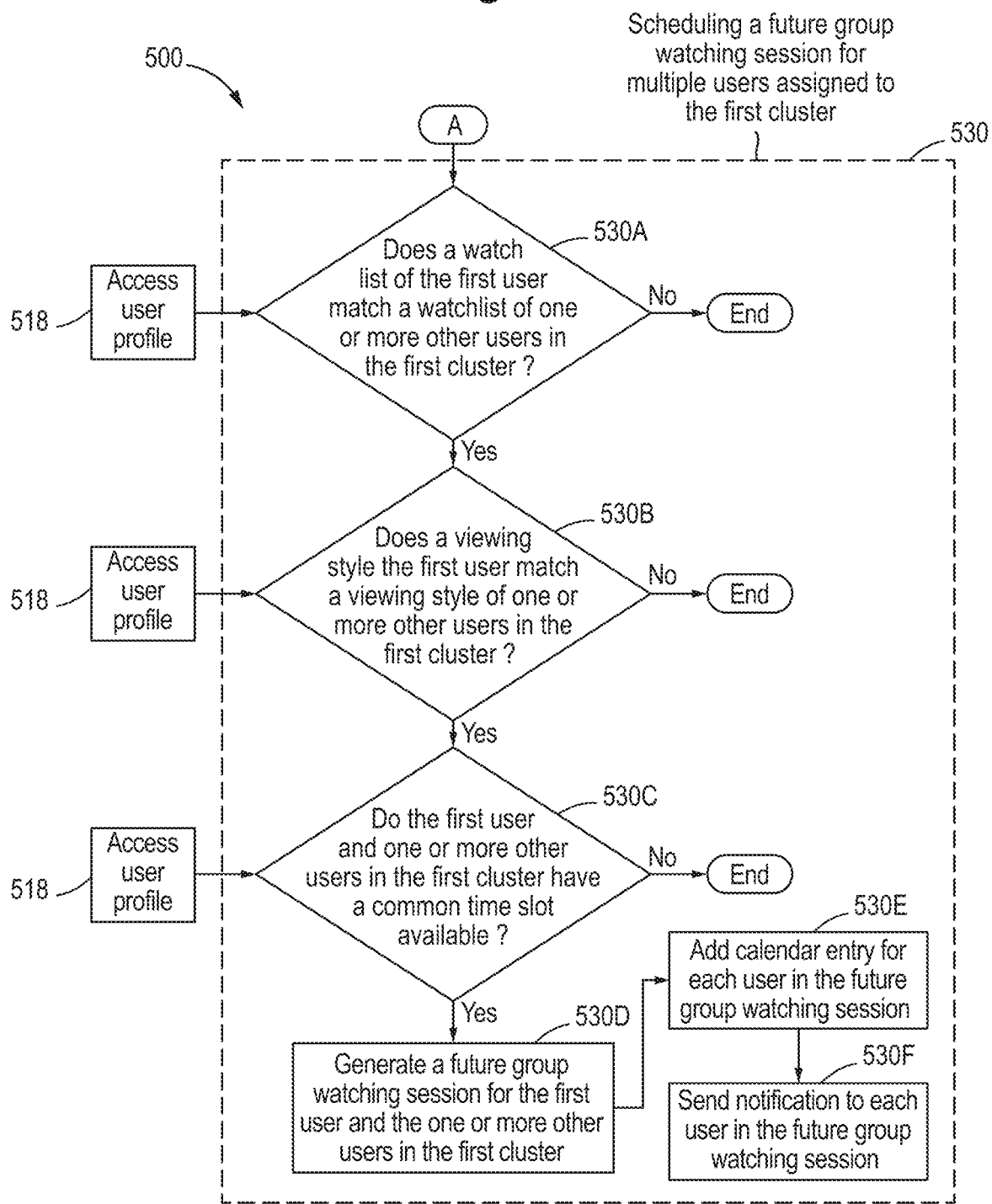

METHODS AND SYSTEMS FOR OPERATING A GROUP WATCHING SESSION

BACKGROUND

The present disclosure relates to methods and systems for operating a group watching session. Particularly, but not exclusively, the present disclosure relates to generating one or more communication clusters for group communication between multiple participants in the group watching session having similar preferences.

SUMMARY

It is common for users to participate in a communal viewing of a media content item. In some cases, users in different locations may each view a broadcast or streamed media content item, thereby participating in a shared viewing experience. In other cases, users may participate in a scheduled group watching session in which users at different locations have chosen to view a certain media content item, e.g., at a scheduled time. In both cases, users may wish to communicate with each other while viewing the media content item. However, where a large number of users are viewing the media content item, group communication between the user can become difficult, e.g., by virtue of a large volume of comments by the users and/or the comments of some users being irrelevant to other users.

In a first approach, there is provided a method for operating a group watching session. The method comprises initiating group communication for a group watching session displaying a media content item to multiple users, generating one or more communication clusters for the group communication, determining a user preference of a first user of the multiple users participating in the group communication, and assigning, based on the user preference, the first user to a first communication cluster of the one or more communication clusters for communication with another of the multiple users. Communication clusters are a subset of the multiple users participating in the group communication.

In some examples, the method further comprises scheduling, automatically, a future group watching session for multiple users assigned to the first cluster.

In some examples, the method further comprises determining one or more parameters of the media content item; and/or monitoring user comments of the multiple users participating in the group communication. For example, the monitoring of user comments may be carried out using natural language processing (NLP), In addition, generating the one or more communication clusters is based on the determined one or more parameters of the media content item and/or the monitored user comments. Accordingly, user preference is based on at least one of: users' profiles, watch history, watchlist, and calendar data; the system can predict what time and how much time a user can spend watching content.

In some examples, monitoring the user comments comprises determining a subject of a comment of the first user, method further comprises assigning the first user to the first communication cluster based on the determined subject.

In some examples, monitoring the user comments comprises determining a correlation between comments of multiple users. The method may further comprise generating a communication cluster when the correlation is above a correlation threshold. That is to say that, for example, the cluster may be created based on how closely data points in the comments match and how similar the opinion of members are.

In some examples, monitoring the user comments comprises determining a rate at which comments are submitted by the users participating in the group watching session for a portion of the media content item. The method may further comprise generating a communication cluster in response to determining that the rate at which comments are submitted by the users participating in the group watching session increases above a threshold rate.

In some examples, determining the one or more parameters of the media content item comprises performing context analysis on the media content item. The method may further comprise at least one of: determining whether to assign the first user to the first communication cluster based on the context analysis; and/or determining whether to create a communication cluster based on the context analysis.

In some examples, the method further comprises: determining an expected number of participants in the group watching session; and generating at least one communication cluster for the group communication based on the expected number of participants in the group watching session before initiating the group communication.

In some examples, determining a user preference of the first user comprises accessing a communication profile of the first user, the communication profile indicating one or more communication habits of the first user based on one or more historic group watching sessions.

In some examples, the method further comprises receiving a comment from the first user assigned to the first communication cluster, and selectively transmitting the comment to the other users assigned to the first communication cluster or all users participating in the group communication.

In another aspect, there is provided a non-transitory computer-readable medium having non-transitory computer-readable instructions encoded thereon that, when executed by control circuitry, carry out a method, the method comprising: initiating group communication for a group watching session displaying a media content item to multiple users; generating one or more communication clusters for the group communication; determining a user preference of a first user of the multiple users participating in the group communication; and assigning, based on the user preference, the first user to a first communication cluster of the one or more communication clusters (a subset of the multiple users participating in the group communication) for communication with another of the multiple users.

In another aspect, there is provided a media device for operating a group watching session, the media device comprising control circuitry configured to: initiate group communication for a group watching session displaying a media content item to multiple users; generate one or more communication clusters for the group communication; determine a user preference of a first user of the multiple users participating in the group communication; and assign, based on the user preference, the first user to a first communication cluster of the one or more communication clusters (a subset of the multiple users participating in the group communication) for communication with another of the multiple users.

In another aspect there is provided a system for operating a group watching session, the system comprising: means for initiating group communication for a group watching session displaying a media content item to multiple users;

means for generating one or more communication clusters for the group communication; means for determining a user preference of a first user of the multiple users participating in the group communication; and means for assigning, based on the user preference, the first user to a first communication cluster of the one or more communication clusters for communication with another of the multiple users.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 5A and 5B are flowcharts representing a process for operating a group watching session in accordance with some examples of the disclosure.

DETAILED DESCRIPTION

The disclosure herein generally discloses the idea of clustering comments (e.g., comments from different users watching a live broadcast) and assigning users to clusters based on their interests, likes, preferences, and the like, as will be explained in more detail below. The clustering of users can be enhanced by performing natural language processing (NLP), as well as performing some processing in real-time. In addition, the automatic creation of watch party groups based on user's viewing patterns and interests, for example by using the users' profiles, watch history, watchlist, and calendar data, the system can predict what time and how much time a user can spend watching content.

Figure 1:
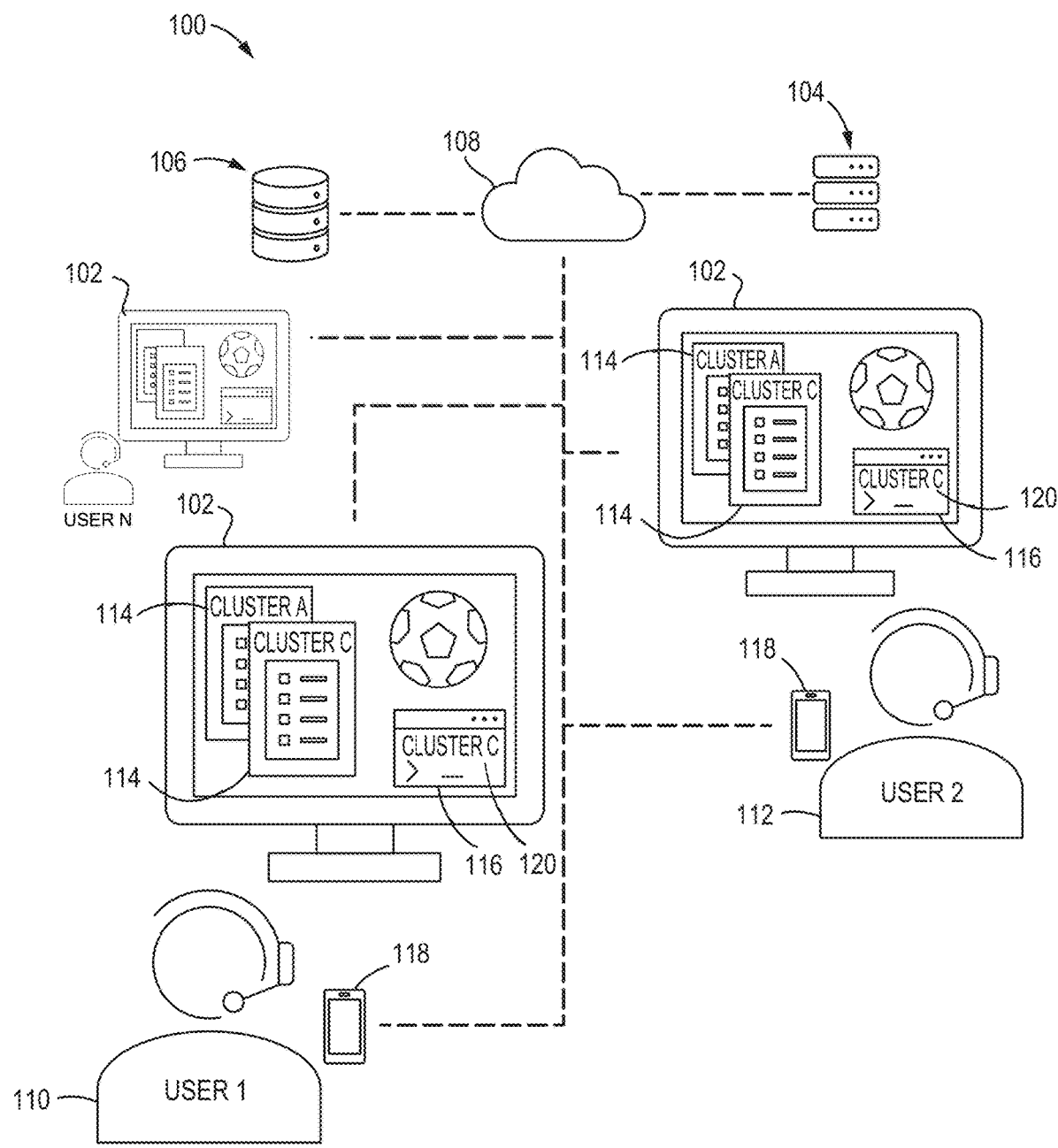
FIG. 1 illustrates an overview of a system for operating a group watching session, in accordance with some examples of the disclosure.

FIG. 1 illustrates an overview of a system 100 for operating a group watching session, in which the viewing of a media content item is enabled for multiple users. In the context of the present disclosure, the term group watching session is used to describe a situation where a media content item may be viewed by multiple users, e.g., at different locations, at substantially the same time. For the avoidance of doubt, a broadcast or streamed media content item that is viewable by multiple users is referred to herein as a group watching session. Alternatively, a group watching session may be a scheduled event in which users arrange to meet, e.g., virtually, to view a media content item, e.g., synchronously. The example shown in FIG. 1 illustrates users viewing a media content item (in this case a soccer game) and participating in group communication, e.g., so that they can comment on the media content item while they are viewing it. In some examples, a comment may be made verbally, e.g., by virtue of teleconference or video conference functionality. Additionally or alternatively, a comment may be made textually, e.g., by virtue of text chat functionality.

To put the example shown in FIG. 1 into context, user 110 (e.g., a first user or "User 1") and user 112 (e.g., a second user or "User 2") may have joined a group watching session (e.g., broadcast, streamed or pre-recorded) to watch a soccer game. FIG. 1 also shows another user 114 ("User N"), who represents one or more other users participating in the group watching session. While the examples described herein make reference to actions relating to user 110 and user 112, it is to be understood that the systems and methods disclosed herein are not limited to the number of participants shown in the accompanying figures. Indeed, the systems and methods disclosed herein are applicable to a group watching session comprising an appropriate number of users, e.g., a few users, or 10s, 100s or 1000s of users, as permitted by the system architecture.

In some cases, there might be a certain portion of the media content item for which users 110 and 112 shares a common interest, and are thus likely to want to participate in group communication for the purpose of discussing that portion of interest. For example, user 110 and user 112 may both share an interest in a particular player in the soccer game and may discuss that player's performance, e.g., when that player is involved in a passage of play. On the other hand, other users participating in the group watching session, such as User N, may have less (or no) interest in that player. As such, it is desirable to have a dedicated chat group specifically for users with interest in that player, e.g., to enable likeminded users (e.g., users 110 and 112) to chat directly about a certain topic and/or to avoid providing irrelevant discussion to certain users (e.g., User N). The present disclosure, as discussed in detail below, provides improved systems and methods for operating a group watching session by generating one or more clusters to which a user is assigned. In this manner, users that are assigned to the same cluster can access a first group communication session, e.g., a common communication channel, to communicate with one another, while users who are not assigned to that cluster do not have access to the first group communication session.

In the example shown in FIG. 1, system 100 includes multiple user devices 102, such as a tablet computer, a smartphone, a smart television, or the like, configured to display media content to one or more respective users. System 100 may also include network 108 such as the Internet, configured to communicatively couple user devices 102 to one or more servers 104 and/or one or more content databases 106 from which media content, such as TV shows, movies and/or advertisement content, may be obtained for display on the user devices 102. User devices 102 and the one or more servers 104 may be communicatively coupled to one another by way of network 108, and the one or more servers 104 may be communicatively coupled to the content database 106 by way of one or more communication paths, such as a proprietary communication path and/or network 108. In some examples, server 104 may be a server of a service provider who provides media content for display on user devices 102.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for displaying and or capturing content, e.g., images and/or videos, as described above. In some examples, the user equipment device may have a front-facing screen and a rear-facing screen, multiple front screens, or multiple angled screens. In some examples, the user equipment device may have a front-facing camera and/or a rear-facing camera.

Figure 2:
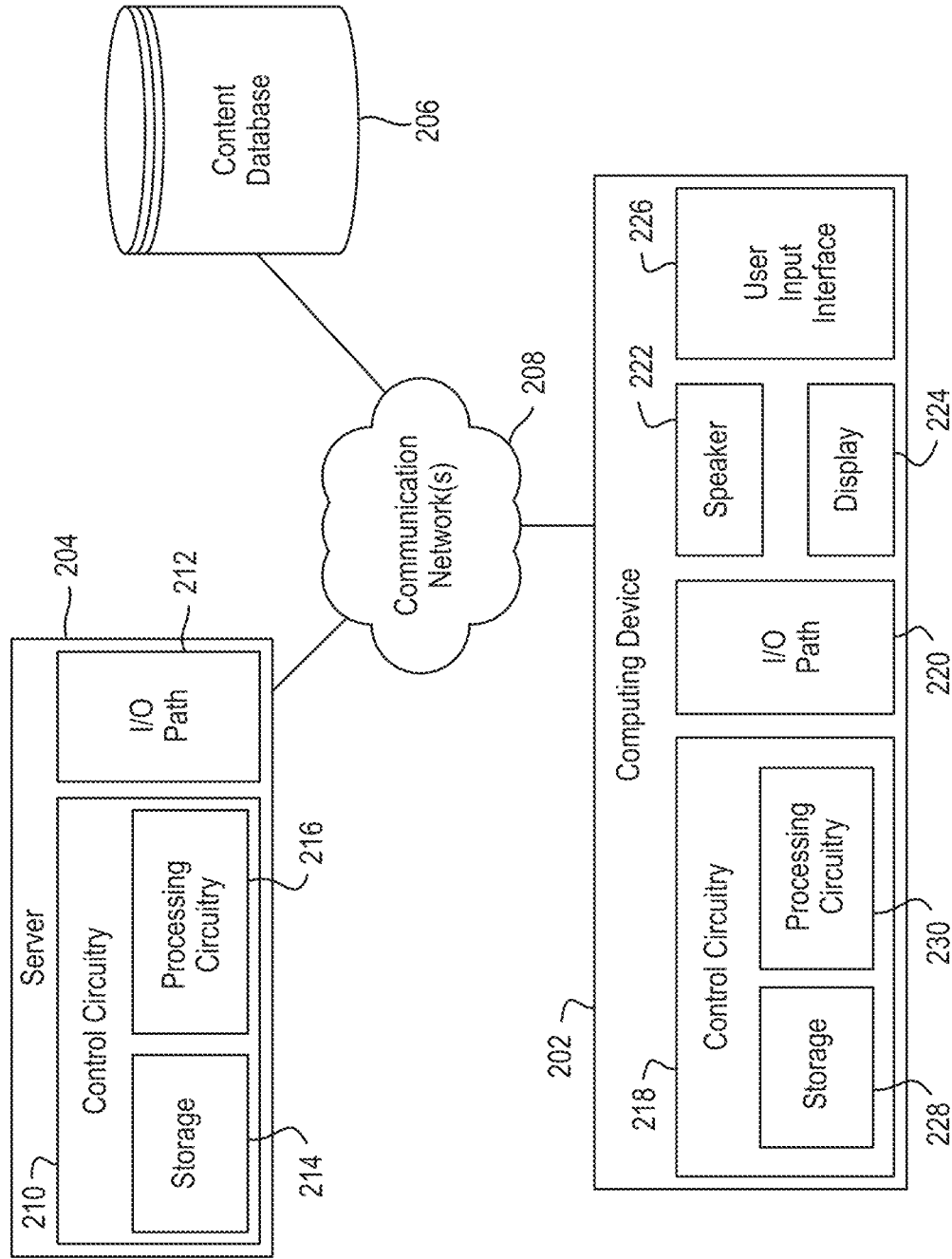
FIG. 2 is a block diagram showing components of an example system for sharing an experience between users, in accordance with some examples of the disclosure.

FIG. 2 is an illustrative block diagram showing example system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server 204 (e.g., server 104), and content database 206 (e.g., content database 106), each of which is communicatively coupled to communication network 208 (e.g., network 108), which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216, which may comprise imaging processing circuitry. Computing device 202, which may be an augmented reality headset, a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user-selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storage 214, 228 or instead of storage 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to initiate a group watching session, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O paths 212 and 220, respectively. For instance, I/O path 212 and/or I/O path 220 may include a communication port(s) configured to transmit and/or receive (for instance to and/or from the content database 206), via communication network 208, content item identifiers, content metadata, natural language queries, and/or other data. Control circuitry 210, 218 may be used to send and receive commands, requests, and other suitable data using I/O paths 212, 220.

Figure 3:
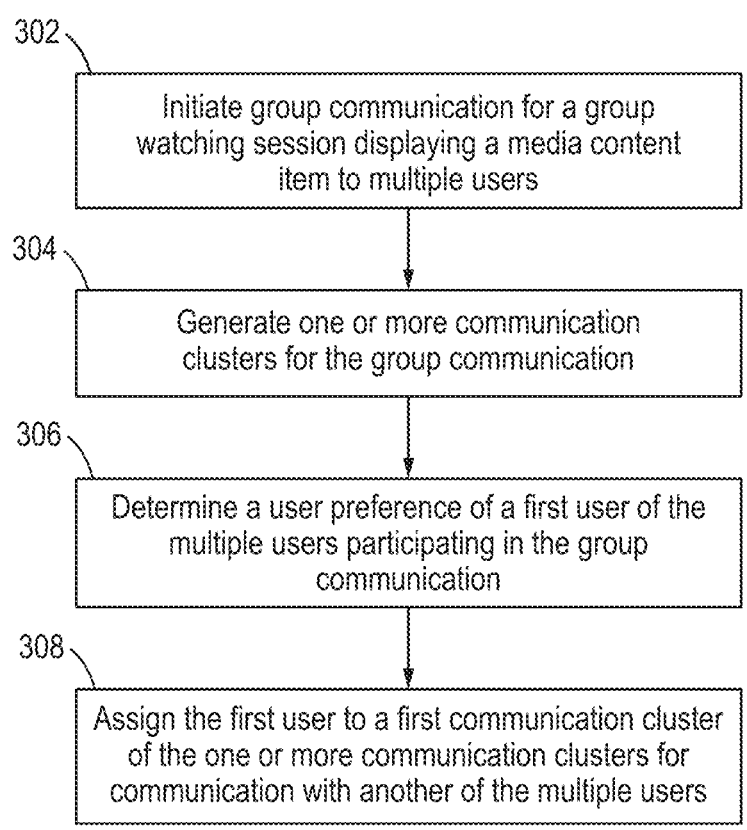
FIG. 3 is a flowchart representing a process for operating a group watching session, in accordance with some examples of the disclosure.
Figure 4:
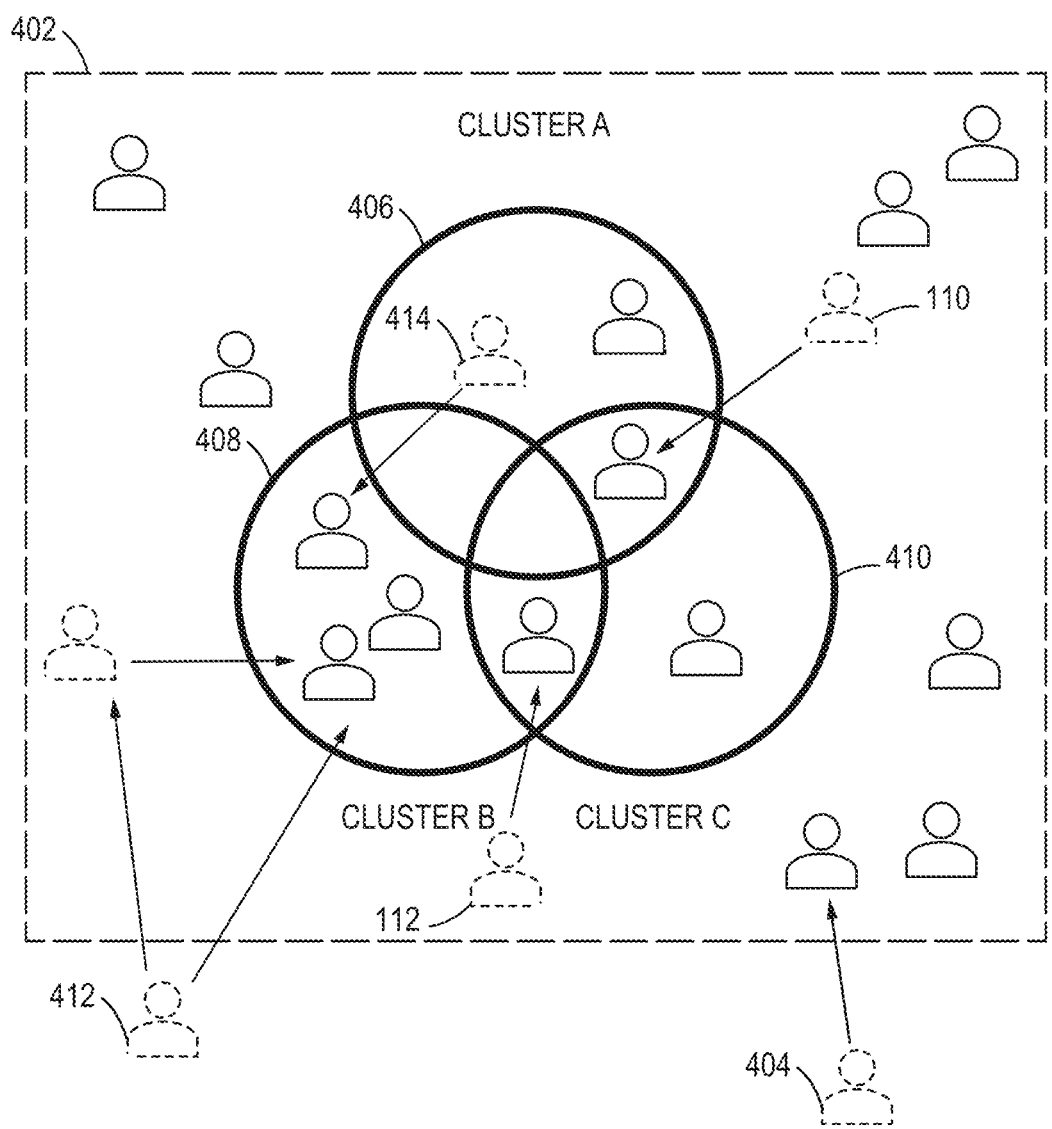
FIG. 4 illustrates group communication clusters, in accordance with some examples of the disclosure.

FIG. 3 is a flowchart representing an illustrative process 300 for operating a group watching session, in accordance with some examples of the disclosure. FIG. 4 illustrates group communication clusters. While the example shown in FIGS. 3 and 4 refer to the use of system 100, as shown in FIG. 1, it will be appreciated that the illustrative process described by FIGS. 3 and 4, and any of the other following illustrative processes, may be implemented on system 100, either alone or in combination with any other appropriately configured system architecture, such as system 200 shown in FIG. 2.

At 302, control circuitry, e.g., control circuitry 218, initiates group communication for a group watching session displaying a media content item to multiple users. In some cases, the group communication is initiated, e.g., automatically, in response to receiving a user input, e.g., a user device 102, to display a media content item. Alternatively, group communication is initiated, e.g., automatically, in response to one or more users joining a group watching session. For example, the control circuitry may monitor the activity of a user to determine whether the user is active in a group watching session, e.g., by virtue of the user logging into the group watching session or otherwise. In some cases, the control circuitry may initiate group communication for a scheduled group watching session, e.g., so the users scheduled to participate in the group watching session are able to communicate with one another as soon as they join the group watching session. Irrespective of how the group communication is initiated, a user may be added, automatically, to a general group communication session (represented by dashed box 402 in FIG. 4), e.g., as they join a group watching session. For example, referring to FIG. 4, user 404 may be added to the general group communication session 402 for communication with other users who are in the general group communication session 402 but outside of a communication cluster. In some cases, there is no restriction on communication between users who are in the general group communication session 402 but outside of a communication cluster. Indeed, any comment provided by a user, e.g., user 404, in the general group communication session 402 may be heard/read by any other user in the general group communication session 402. In some cases, the allocation of a user to a communication cluster may impose restrictions on the communication between users in the general group communication 402.

Referring back to FIG. 3, at 304, control circuitry, e.g., control circuitry 210, generates one or more communication clusters for the group communication. For example, a communication cluster for users participating in the group watching session may be generated based on one or more parameters, such as: the number of users in the group watching session, the number of users expected to join the group watching session (e.g., before the group watching session began and/or during the group watching session), a user profile (e.g., a user profile of one or more of the users participating in and/or expected to join the group watching session), one or more comments provided in the general group communication 402 (e.g., by a user or a subset of users), metadata of the media content item (e.g., metadata describing the content of the media content item, such as a synopsis for the media content item, information about an individual (e.g., actor, character, player) in the media content item, a type and/or genre of the media content item, and/or the format of the media content item (e.g., one or more audio and/or visual parameters of the media content item, for example as shown on the user devices 102 of respective users). In the example shown in FIG. 4, control circuitry has generated three communication clusters, cluster A 406, cluster B 408 and cluster C 410, e.g., based on media content item metadata, such as the teams playing in the soccer game. For example, cluster A 406 may represent a first team playing in the soccer game (such as Manchester United), cluster B may represent a second team playing in the soccer game (such as Barcelona), and cluster C may represent a player in one of the teams (such as Cristiano Ronaldo). In some examples, one or more of the generated clusters may be a static cluster, meaning that it is generated before the users in the group watching session start viewing the media content item. Additionally or alternatively, one or more of the generated clusters may be a dynamic cluster, meaning that it is generated while the users in the group watching session are viewing the media content item, e.g., based on what is happening in the media content item. In the example shown in FIG. 4, clusters A and B are static clusters, and cluster C is a dynamic cluster. For example, clusters A and B, which represent the teams, may be generated ahead of time, since the teams scheduled to compete in the game will not change. However, cluster C, which represents a player, may be generated at some point during the game, e.g., as that player is brought onto the field. As such, the methods and systems disclosed herein envisage using static and dynamic clusters, either alone or in combination. The generation of a cluster, specifically a dynamic cluster, is described below in more detail in relation to the example shown in FIGS. 5A and 5B. Furthermore, it is understood that the present disclosure is not limited to the number and/or type of communication clusters shown in the accompanying figures. For example, the control circuitry may determine the number of users participating (e.g., current and/or expected users) as a certain number, e.g., 10,000, and generate a number of multiple (static and/or dynamic) clusters as a fraction of this number, e.g., 1000 clusters.

In the example described above, the communication clusters are generated, e.g., defined, based on metadata relating to the media content item. For example, a limit or boundary for each of the communication clusters may be based on metadata relating to the media content item. In other words, a limit or boundary for cluster A may be set as, or relating to, Manchester United, such that communication between users in that cluster is directed towards the topic of Manchester United. In other examples, a limit or boundary for each of the communication clusters may be based on one or more of the above-listed parameters. In some examples, upon generation of a communication cluster, the control circuitry may generate metadata describing a limit or boundary of the communication cluster. Regardless of how a communication cluster is generated, one of the aims of the present disclosure is to provide more focused communication between users participating in a group watching session.

At 306, control circuitry, e.g., control circuitry 218, determines a user preference of at least one user of the users participating in the group communication, e.g., in the general group communication 402. For example, the control circuitry may access a user profile of the first user 110 and determine that, based on data in the user profile, the first user 110 has an interest in the team Manchester United and the player Cristiano Ronaldo. In a similar manner, the control circuitry may access a user profile of the second user 112 and determine that, based on data in the user profile, the second user 112 has an interest in the team Barcelona and the player Cristiano Ronaldo. The data in the user profile may be data that is manually entered by the user and/or data that is automatically gathered by the control circuitry. For example, the control circuitry may monitor user activity to determine whether the user is more or less interested in a particular topic, e.g., by reviewing the user's viewing history and/or the user's comments in one or more previous communications, such as communication during a previous group watching session and/or other types of communications, like emails and text messages.

At 308, control circuitry, e.g., control circuitry 210, assigns a user to one or more of the communication clusters, e.g., for focused communication with another of the multiple users participating in the group watching session. For example, the control circuitry may compare a determined user preference with metadata describing a limit or boundary of the communication cluster. Where control circuitry determines an association between a determined user preference of a user and a communication cluster, the control circuitry may assign that user to that communication cluster, e.g., so that that user can communicate with other users already assigned to that cluster. In the example shown in FIG. 4, the first user 110 is assigned, e.g., moved, to cluster A and cluster C, e.g., by virtue of their user profile indicating an interest in the team Manchester United and the player Cristiano Ronaldo, and the second user 112 is assigned, e.g., moved, to cluster B and cluster C, e.g., by virtue of their user profile indicating an interest in the team Barcelona and the player Cristiano Ronaldo. In this manner, the first user 110 can communicate with, e.g., only with, other users in cluster A and cluster C, and the second user 112 can communicate with, e.g., only with, other users in cluster B and cluster C. In some cases, a user may select who is able to access, e.g., see and/or hear, a comment made during the group communication. For example, when the first user 110 makes a comment, they may choose whether to post the comment in cluster A, cluster B and/or the general group communication 402. In the example shown in FIG. 1, the user device 102 of each user is configured to display a chat or comment history window 114 for each cluster to which the user has been assigned and a chat or comment input window 116 overlaid onto the media content item. However, in another example, the chat or comment history window 114 and/or the chat or comment input window 116 may be displayed on a separate user device, e.g., on a smartphone 118 of the user. In FIG. 1, each of the first user 110 and the second user 112 has selected to communicate to cluster C, indicated by icon 120 in the chat or comment input window 116 and the chat or comment history window 114 for cluster C being in front of the chat or comment history window 114 for the other cluster to which they are assigned. As such, the first and second users 110, 112 are able to communicate with each other regarding the player Cristiano Ronaldo, e.g., without clogging up the general group communication 402 with chat/comments relating to Cristiano Ronaldo. Likewise, user 110 can communicate with other Manchester United fans and user 112 can communicate with other Barcelona fans, by virtue of being assigned to cluster A and cluster B, respectively.

In some examples, the communication content of a cluster (e.g., comments or chat posts between cluster members) may be accessed, e.g., viewed and/or heard, by one or more other users not assigned to that cluster. For example, the control circuitry may be configured to allow users not assigned to a cluster to observe, e.g., without commenting, the communication between cluster members. For example, the control circuitry may be configured to display a list of active communication clusters, e.g., along with the name/title of the communication cluster and/or topics being discussed by members of the communication cluster, so that a user outside the cluster can select to enter, e.g., as a passive member, into the communication cluster to follow the chat/comments made by members of the cluster.

In the example shown in FIG. 4, user 110 and user 112 are assigned to, e.g., moved to, the relevant clusters from the general group communication 402. However, the control circuitry may be configured to assign a user directly to one or more clusters upon joining the group watching session, e.g., partway through the presentation of the media content item. For example, user 412 may join the group watching session after the start of the media content item. Upon joining the group watching session, the control circuitry may access a user profile of user 412 to determine one or more likely interests of user 412. For example, a user profile of user 412 may indicate a preference for the soccer team Barcelona, and, as such, the control circuitry may assign user 412 directly to cluster B upon joining the group watching session. In another case, user 412 may be first placed in the general group communication 402, and subsequently moved to cluster B, e.g., following the determination of a likely interest of user 412, e.g., by monitoring the comments of user 412 in the general group communication 402, or by user 412 manually selecting to be moved to cluster B.

For example, user 412 may be placed in the general group communication 402 and may start chatting with other members of the general group communication 402 by stating "Barcelona are awesome today" or "Manchester United are the worst". As such, the control circuitry may determine that user 412 likes Barcelona and/or dislikes Manchester United. In response, the control circuitry may move user to a cluster, such as cluster B, where user 412 is placed with other users who also like Barcelona. In some examples, a user may be moved between communication clusters. For example, user 414 may be moved from cluster A to cluster B, e.g., based on one or more comments made by user 414 while contributing to the chat among members of cluster A. For example, user 414 may make a comment that is not aligned with the current topic of discussion in cluster A, "Manchester United are the worst".

The actions or descriptions of FIG. 3 may be used with any other example of this disclosure, e.g., the example described below in relation to FIGS. 5A and 5B. In addition, the actions and descriptions described in relation to FIG. 3 may be done in any suitable alternative orders or in parallel to further the purposes of this disclosure.

FIGS. 5A and 5B show a flowchart representing an illustrative process 500 for sharing an experience between users, in accordance with some examples of the disclosure. FIG. 7 shows navigation between locations associated with various images. FIGS. 8A to 8C illustrate various images each having a first set of elements at a different point in time. FIGS. 9 and 10A illustrate further images each having a respective set of elements. FIG. 10B illustrates another image having a set of elements including an overlaid representation of a transient event. While the example illustrated by FIGS. 6A to 10B refers to the use of system 100, as shown in FIG. 1, it will be appreciated that the illustrative process described in relation to FIGS. 3 to 5B, and any of the other illustrative processes described herein, may be implemented on system 100, either alone or in combination with any other appropriately configured system architecture, such as system 200 shown in FIG. 2.

At 502, control circuitry, e.g., control circuitry 218, initiates group communication for a group watching sessions displaying a media content item to multiple users. A live broadcast, regardless of what content (e.g., broadcasting an event, a conversation, a movie, or the like) is being broadcasted, is essentially a group watch when the client application enables the viewers to communicate with each other, e.g., via text-based chats. Watch parties as a concept are well known in the literature and commercial products (e.g., Meta and many OTT providers offer this feature). Watch parties are becoming more sophisticated however since newer generations are very open to watching with other people who are located in other countries and speak different languages, this is further validated by the success of online gaming. In some examples, the creation of clusters is initiated by the chat application in response to detecting increased viewer activities (e.g., many people using the chat functionality) at any time during the broadcast or at certain times within the content while considering the context of the media being presented. For example, an increased chat activity during an advertisement break might not require the creation of clusters. Similarly, increased chat activity at the beginning of an event, i.e., while viewers are "settling in" might not trigger the creation of clusters or user assignment.

At 504, control circuitry, e.g., control circuitry 218, monitors user comments of the multiple users participating in the group communication. In particular, monitoring the user comments may comprise a plurality of processes, represented by the dotted lined box in FIG. 5, labelled 504. For example, at 504A, control circuitry, e.g., control circuitry 218, determines a subject of a comment of the first user. In some examples, the first user to the first communication cluster is assigned based on the determined subject. Moreover, at 504B, control circuitry, e.g., control circuitry 218, a correlation between comments of multiple users is determined. In some examples, a communication cluster is generated when the correlation is above a correlation threshold. At 504C it is determined if the correlation is above a correlation threshold. If the answer to 504C is "No" process 500 continues to 506, wherein the system maintains general group communication. If the answer to 504C is "Yes" process 500 continues to 510, which is discussed in more detail below.

At 504D, control circuitry, e.g., control circuitry 218, determines a rate at which comments are submitted by the users participating in the group watching session for a portion of the media content item. In some examples, the control circuitry further generates a communication cluster in response to determining that the rate at which comments are submitted by the users participating in the group watching session increases above a threshold rate. At 504E, it is determined if the rate at which comments are submitted by the users participating in the group watching session is above a threshold rate. If the answer to 504E is "No" process 500 continues to 506, wherein the system maintains general group communication. If the answer to 504E is "Yes" process 500 continues to 510, which is discussed in more detail below. 504A-C and 504D-E may be performed sequentially, in any order, or in parallel, as shown in FIG. 5A.

At 508, control circuitry, e.g., control circuitry 218, determines a number of users participating in the group communication. At 510, control circuitry, e.g., control circuitry 218, generates one or more communication clusters for the group communication. At 512, control circuitry, e.g., control circuitry 218, accesses metadata for the media content item. At 514, control circuitry, e.g., control circuitry 218, performs context analysis on the media content item. In some examples, the performing context analysis on the media content item may be a processing action of determining one or more parameters of the media content item, wherein, generating the one or more communication clusters are based on the determined one or more parameters of the media content item. In addition, the system may also carry out at least one of: i) determining whether to assign the first user to the first communication cluster based on the context analysis; or ii) determining whether to create a communication cluster based on the context analysis. The context of the media is important since context normally triggers increased chat activity. For example, viewers watching a broadcast of an event where a popular singer joins the stage can trigger users to start commenting in the chat window. Another example is an interesting play during a Football game (e.g., a touchdown is scored, a pass is intercepted, etc.). Other examples of context include viewers voting on a contestant (e.g., "Yes/No", "Stay/Vote off", etc.) during a talent show. That might not lead to the creation of clusters. For completeness, the detection of an ad break can be done in many ways; there are many ways to signal an ad break to the player's logic depending on the ad delivery technology being used (e.g., ad break can be signalled within the manifest or playlist file), or the player's ad SDK (client-side) can initiate such request. Regardless of the technology that is being used, such information is shared or accessible to the chat application, or even specific modules within the chat application. For example, performing natural language of comments being posted by various viewers at certain times during a broadcast can be beneficial to collect statistics, viewers' sentiment about what's being displayed (e.g., a product, a political ad), etc. Similarly, detecting events such as scoring a touchdown, is also a well-known technique that relies on computer vision and machine learning models. Such models are readily available and are considered to be within the scope of the present disclosure. All this metadata is available for the chat application to determine whether to initiate the clustering/user's assignment feature.

Actions carried out by control circuitry, as described above with reference to 508, 512, 514, 504C and 504E, are fed into 510, the generation of one or more communication clusters for the group communication. Here it is shown that the number of users participating in the group communication, the metadata of the media content item, the context of the media content item, and the user comments each, or in any combination, impact the generation of the one or more communication clusters for the group communication. The creation of clusters based on similar comments (i.e., data points) about a topic (e.g., sports, cars, flights, etc.) can also be subdivided based on factors such as how "closely" similar the opinions are to each other or the sentiment of the opinion as well. For example, this could be used to prevent bullying or online abuse in chat rooms, where a number of people are verbally attacking another number of people because they disagree with them on a certain topic or have different opinions. Many unsupervised machine learning models exist to create clusters from text and documents, and also support the use of hard and soft clustering. Hard and soft clustering are terms known in the art. For example, clustering viewers (i.e., grouping them) into clusters wherein one user belongs to just one cluster at any one time is referred to as hard clustering. Accordingly, clustering viewers into clusters wherein one user may belong to multiple clusters at any one time is referred to as soft clustering.

In more detail, existing clustering algorithms use techniques such as word embedding, wherein a word is mapped to a vector space (e.g., n-dimensional), such that similar words are in the same vector space. Other clustering algorithms e.g., K-means, which are vector-based, also return cluster assignments, however, the K-means algorithm requires the final number of clusters to be known ahead of time. Accordingly, estimating the number of clusters is important to utilize the K-means algorithms, and in the present disclosure, the number of users participating in the chat can be taken advantage of for this purpose. For example, the number of predetermined clusters chosen can be a percentage of the number of new users, the percentage of users for each team, geography, and the like. Both of these types of clustering algorithms, and others, are considered to be applicable and within the scope of the present disclosure.

Utilizing the percentage of the number of new users may be optimal, however, because each user is likely to be talking about a topic that is subtly different and perhaps not distinct from other viewers. In some examples, the results can be verified by utilizing historical cluster data associated with users whose comments were not part of the data set that was clustered—i.e., by attempting to find a cluster where these users can fit in within the newly formed set of clusters and estimating a fitting score (i.e., does the user fit with the newly created clusters based on their historical cluster assignments).

At 516, control circuitry, e.g., control circuitry 218, assigns the first user to a first communication cluster. In some examples, the communication profile indicates one or more communication habits of the first user based on one or more historic group watching sessions. Adopting any clustering algorithm in real-time chat can be challenging and therefore it is beneficial if the control circuitry (or an optimized cluster module) uses a pre-existing layer of data about users, in addition, to sample text, for clustering purposes. For example, comments or posts originating from new users with increased activity can be sampled. In some examples, such analysis can also be carried out periodically.

At 518, control circuitry, e.g., control circuitry 218, accesses user profile data. For example, At 520, control circuitry, e.g., control circuitry 218, determines a communication profile of the first user. The assigning of the first user to a first communication cluster may be based on the one or more media content item parameters of the media content item, as shown in FIG. 5A. In some examples, the cluster information is consistent across related content, such as various episodes of a TV Series or sporting league. In particular, when roughly the same group of users are consuming the content. Therefore, for example, users watching Episode 5 of a particular TV show might automatically be assigned to a cluster based on where they were placed when watching the previous episode.

In some examples, new users joining the stream are automatically added to a created cluster based on their user profile. In these examples, the user profile is not the user's watch history, but rather their "chat profile." The user chat profile can include dynamic scores or weights with respect to predefined habits. For example, one parameter (topicDeviation) can be their tendency to deviate from topics related to the content being watched (e.g., such user might always bring up political topics when the genre of the content is a movie about car races). Another parameter can be, for example, "activityPersistence" which could indicate a score of whether this user is constantly active (i.e., posting comments in the chat window) during media consumption. Additionally, such parameter can be also be tied to content genre (i.e., the user does not participate in chat activities while watching a scary movie but post a lot of comments while watching a sports game)—For example, parameters such as, "activityPersistence_Sports", "activityPersistence Genre Horror", and the like. Such weights are initially zero, and the weight is created and refined over time as the user consumes content in "private" group watch or "public" group watch environments. In some examples, the weightings and scores can also be determined from data collected across viewing sessions associated with the user with various services and on different platforms as well. For example, viewers on mobile devices with limited screen sizes might behave differently when consuming the content in a group watch setting on a bigger screen, e.g., have a lower level of engagement with other users via chat. The scores that are determined above can be used by the group watch creation service to group users together. Other criteria are also considered, for example, location (time zone), availability, etc. In some examples, a user that is watching a recording of the event (e.g., alone) does not see all the chat and textual comments recorded during the recording. For example, playback of the video with comments from the cluster(s) that the user likely fits in is chosen (if such user data is available). This is beneficial so that the user is not overwhelmed by a large number of comments, detracting from the overall viewing experience.

At 522, control circuitry, e.g., control circuitry 218, receives a comment from the first user assigned to the first communication cluster. In some examples, the control circuitry selectively transmits the comment to the other users assigned to the first communication cluster or all users participating in the group communication For example, as shown in FIG. 5A, at 524, control circuitry, e.g., control circuitry 218, determines if the comment is directed at the first communication cluster or not. If the answer to 524 is "No" then, at 526, control circuitry, e.g., control circuitry 218, transmits the comment to all users participating in the group watching session. If the answer to 524 is "Yes" then, at 528, control circuitry, e.g., control circuitry 218, transmits the comment to the first communication cluster.

As shown in FIG. 5A, after 516, before 522, process 500 branches off at A, which will be described with reference to FIG. 5B. A leads into 530, in particular, 530A. At 530, control circuitry, e.g., control circuitry 218, schedules a future group watching session for multiple users assigned to the first cluster. The scheduling of the future group watching sessions for the plurality of users assigned to the first cluster comprises a plurality of determinations, shown within the dotted box of FIG. 5B. For example, at 530A, control circuitry, e.g., control circuitry 218, determines if a watch list of the first user matches a watchlist of one or more other users in the first cluster. If the answer to 530A is "No" process 500 ends. If the answer to 530A is "Yes" process 500 continues on to 530B. At 530B control circuitry, e.g., control circuitry 218, determines if a viewing style of the first user matches a viewing style of one or more other users in the first cluster. If the answer to 530B is "No" process 500 ends. If the answer to 530B is "Yes" process 500 continues on to 530C. At 530C control circuitry, e.g., control circuitry 218, determines if the first user and one or more other users in the first cluster have a common time slot available. If the answer to 530C is "No" process 500 ends. If the answer to 530C is "Yes" process 500 continues on to 530D. At 530D, control circuitry, e.g., control circuitry 218, generates a future group watching session for the first user and the one or more other users in the first cluster. At 530E control circuitry, e.g., control circuitry 218, adds a calendar entry for each user in the future group watching sessions. At 530F, control circuitry, e.g., control circuitry 218, sends a notification to each user in the future group watching session. The determinations at 530A-C may access and obtain user profile information as described above at 518.

The actions or descriptions of FIGS. 5A to 5B may be used with any other example of this disclosure. In addition, the actions and descriptions described in relation to FIGS. 5A and 5B may be done in any suitable alternative orders or in parallel to further the purposes of this disclosure.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment appropriately, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires it. In particular, where the indefinite article is used, the specification is to be understood as contemplating plurality as well as singularity, unless the context requires otherwise. All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The reader's attention is directed to all papers and documents which are filed concurrently with or previous to this specification in connection with this application and which are open to public inspection with this specification, and the contents of all such papers and documents are incorporated herein by reference.

What is claimed is:

1. A method for operating a group watching session, the method comprising:

identifying first and second users of a plurality of users requesting access to the group watching session, wherein during the group watching session, a media content item is displayed to the plurality of users and group communication is provided for the group watching session;

determining one or more user preferences of the first user;

determining one or more user preferences of the second user;

assigning, based on the one or more user preferences of the first user, the first user to a first communication cluster of a plurality of communication clusters, to enable communication between the first user and other users of the first communication cluster; and assigning, based on the one or more user preferences of the second user, the second user to a second communication cluster of the plurality of communication clusters, to enable communication between the second user and other users of the second communication cluster;

while causing the media content item to be displayed to the plurality of users during the group watching session, determining that a performer is depicted in a current portion of the media content item;

based on determining that the performer is depicted in the current portion of the media content item, generating a dynamic communication cluster for the group watching session, to enable users of the plurality of users that are interested in the performer to communicate; and assigning, based on each of the one or more user preferences of the first user and the one or more user preferences of the second user indicating an interest in the performer, each of the first user and the second user to the dynamic communication cluster, to enable communication between the first user and the second user of the dynamic communication cluster, wherein:

the first user is in each of the first communication cluster and the dynamic communication cluster, and the first user is not in the second communication cluster; and the second user is in each of the second communication cluster and the dynamic communication cluster, and the second user is not in the first communication cluster.

2. The method of claim 1, further comprising:

scheduling, automatically, a future group watching session for a subset of the plurality of users assigned to the first communication cluster.

3. The method of claim 1, further comprising:
generating the plurality of communication clusters by:
determining one or more parameters of the media content item; and
monitoring user comments of the plurality of users participating in the group communication,
wherein, generating the plurality of communication clusters is further based on the determined one or more parameters of the media content item and the monitored user comments.

4. The method of claim 3,
wherein monitoring the user comments comprises determining a subject of a comment of the first user; and
the method further comprises assigning the first user to the first communication cluster based on the determined subject.

5. The method of claim 3, further comprising:
wherein monitoring the user comments comprises determining a correlation between comments of the plurality of users; and
the method further comprises generating the first communication cluster further based on determining that the correlation is above a correlation threshold.

6. The method of claim 3, further comprising:
wherein monitoring the user comments comprises determining a rate at which comments are submitted by the plurality of users participating in the group watching session for the current portion of the media content item; and
generating the first communication cluster in response to determining that the rate at which comments are submitted by the plurality of users participating in the group watching session increases above a threshold rate.

7. The method of claim 1, wherein the initiating the group communication further comprises:
generating a general communication cluster for the group communication for the plurality of users to communicate, prior to generating the plurality of communication clusters.

8. The method of claim 1, further comprising:
wherein determining the one or more user preferences of the first user comprises accessing a communication profile of the first user, the communication profile indicating one or more communication habits of the first user based on one or more historic group watching sessions.

9. The method of claim 1, further comprising:
receiving a comment from the first user assigned to the first communication cluster; and
selectively transmitting the comment to the other users assigned to the first communication cluster or all users participating in the group communication.

10. The method of claim 1, wherein generating the dynamic communication cluster for the group communication is performed based on at least one of visual content of the current portion indicating the performer is being depicted, audio content of the current portion indicating the performer is being depicted, or metadata of the current portion indicating the performer is being depicted, and is performed without analyzing comments of the group communication.

11. The method of claim 1, wherein:
the media content item is a sports match in which a first sports team is playing against a second sports team;
the first communication cluster is for users having profiles indicating an interest in supporting the first sports team in the sports match;
the second communication cluster is for users having profiles indicating an interest in supporting the second sports team in the sports match;
the performer is an athlete on the first sports team; and
the dynamic communication cluster is for users having profiles indicating an interest in the athlete on the first sports team, wherein the one or more preferences of the second user indicate an interest in the athlete on the first sports team despite the interest in supporting the second sports team in the sports match.

12. A non-transitory computer-readable medium having non-transitory computer-readable instructions encoded thereon that, when executed by control circuitry, cause the control circuitry to:
identify first and second users of a plurality of users requesting access to a group watching session, wherein during the group watching session, a media content item is displayed to the plurality of users and group communication is provided for the group watching session;
determine one or more user preferences of the first user of the plurality of users;
determine one or more user preferences of the second user; and
assign, based on the one or more user preferences of the first user, the first user to a first communication cluster of a plurality of communication clusters, to enable communication between the first user and other users of the first communication cluster;
assign, based on the one or more user preferences of the second user, the second user to a second communication cluster of the plurality of communication clusters, to enable communication between the second user and other users of the second communication cluster;
while causing the media content item to be displayed to the plurality of users during the group watching session, determine that a performer is depicted in a current portion of the media content item;
based on determining that the performer is depicted in the current portion of the media content item, generate a dynamic communication cluster for the group watching session, to enable users of the plurality of users that are interested in the performer to communicate; and
assign, based on each of the one or more user preferences of the first user and the one or more user preferences of the second user indicating an interest in the performer, each of the first user and the second user to the dynamic communication cluster, to enable communication between the first user and the second user of the dynamic communication cluster, wherein:
the first user is in each of the first communication cluster and the dynamic communication cluster, and the first user is not in the second communication cluster; and
the second user is in each of the second communication cluster and the dynamic communication cluster, and the second user is not in the first communication cluster.

13. The computer-readable medium of claim 12, wherein execution of the instructions further causes the control circuitry to:
schedule, automatically, a future group watching session for a subset of the plurality of users assigned to the first communication cluster.

14. The computer-readable medium of claim 12, wherein execution of the instructions further causes the control circuitry to:
- determine one or more parameters of the media content item;
- monitor user comments of the plurality of users participating in the group communication; and
- generate the plurality of communication clusters further based on the determined one or more parameters of the media content item and the monitored user comments.

15. The computer-readable medium of claim 14, wherein execution of the instructions further causes the control circuitry to:
- monitor the user comments by determining a subject of a comment of the first user; and
- assign the first user to the first communication cluster based on the determined subject.

16. The computer-readable medium of claim 14, wherein execution of the instructions further causes the control circuitry to:
- monitor the user comments by determining a correlation between comments of the plurality of users; and
- generate the first communication cluster further based on determining that the correlation is above a correlation threshold.

17. The computer-readable medium of claim 14, wherein execution of the instructions further causes the control circuitry to:
- monitor the user comments by determining a rate at which comments are submitted by the plurality of users participating in the group watching session for the current portion of the media content item; and
- generate the first communication cluster in response to determining that the rate at which comments are submitted by the plurality of users participating in the group watching session increases above a threshold rate.

18. The computer-readable medium of claim 12, wherein execution of the instructions further causes the control circuitry to:
- generate at least one general communication cluster for the group communication for the plurality of users to communicate, prior to generating the plurality of communication clusters.

19. The computer-readable medium of claim 12, wherein execution of the instructions further causes the control circuitry to:
- determine the one or more user preferences of the first user by accessing a communication profile of the first user, the communication profile indicating one or more communication habits of the first user based on one or more historic group watching sessions.

20. The computer-readable medium of claim 12, wherein execution of the instructions further causes the control circuitry to:
- receive a comment from the first user assigned to the first communication cluster; and
- selectively transmit the comment to the other users assigned to the first communication cluster or all users participating in the group communication.

\* \* \* \* \*